Jan. 9, 1968 R. R. MELONE 3,362,224
LIQUID LEVEL INDICATOR
Filed Dec. 28, 1964 3 Sheets-Sheet 1
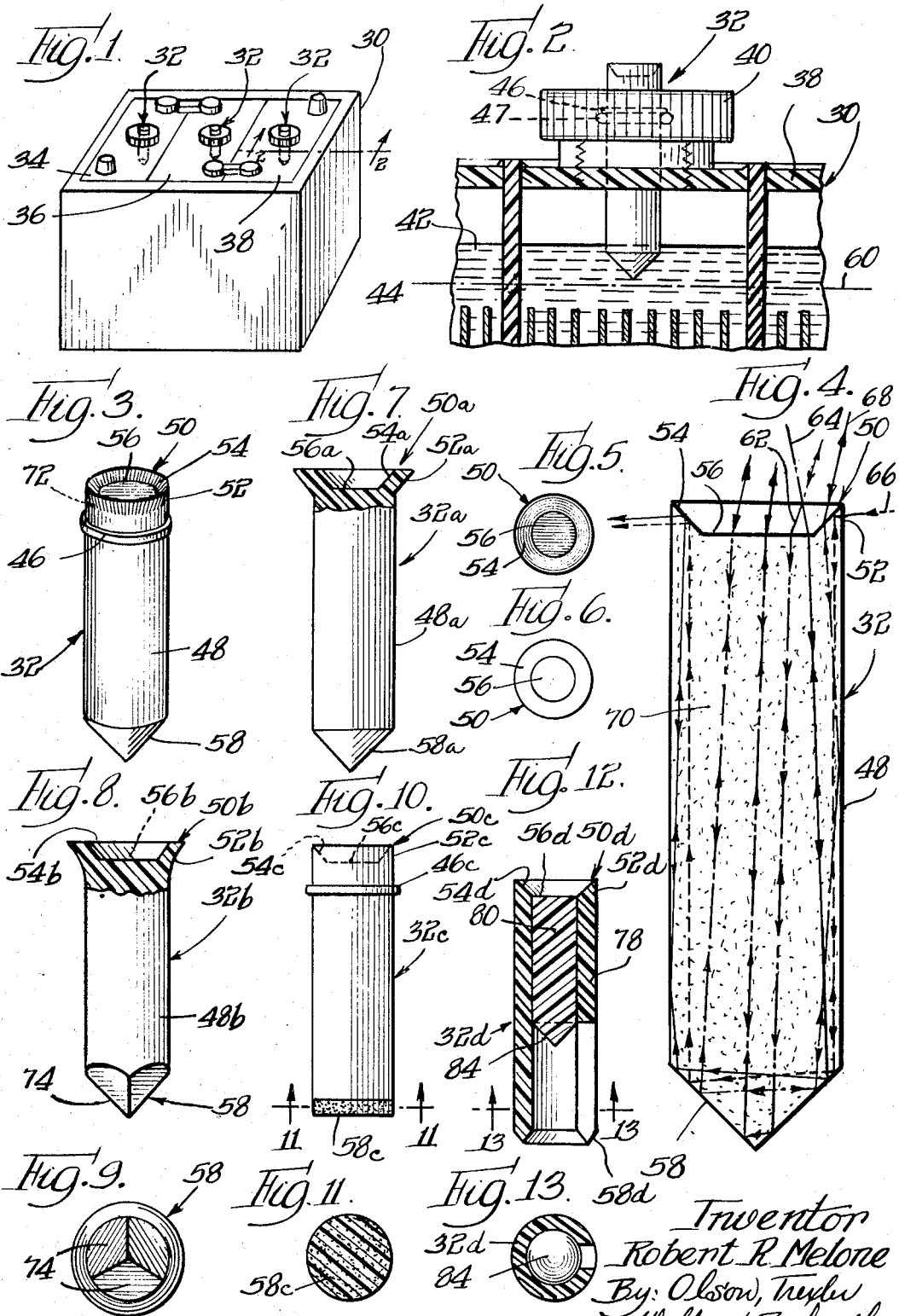
Inventor
Robert R. Melone
By: Olson, Trexler
Wolters & Bushnell
attys.

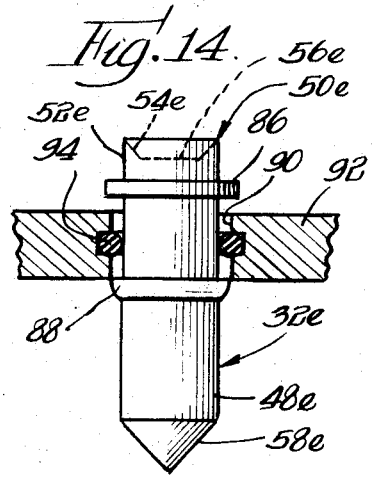
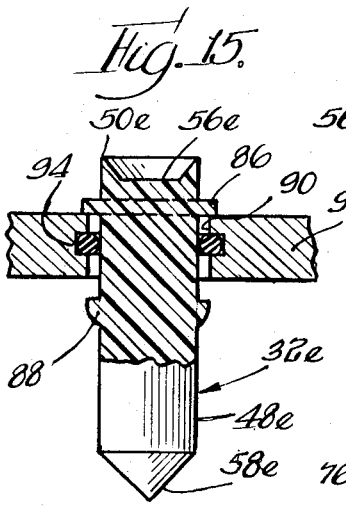
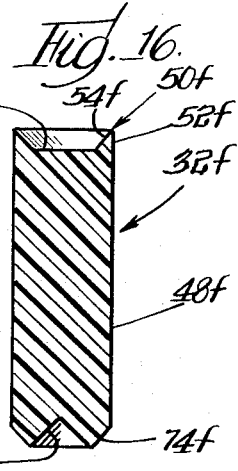
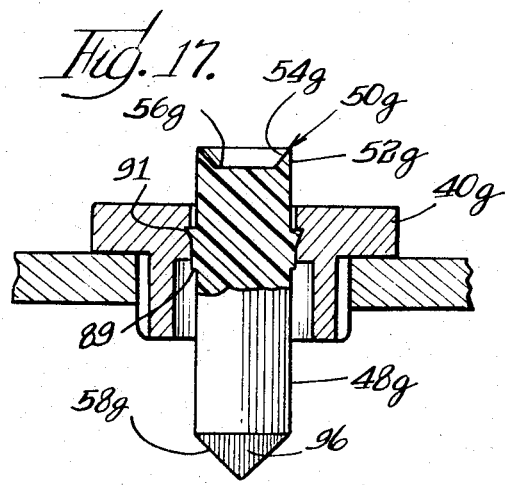
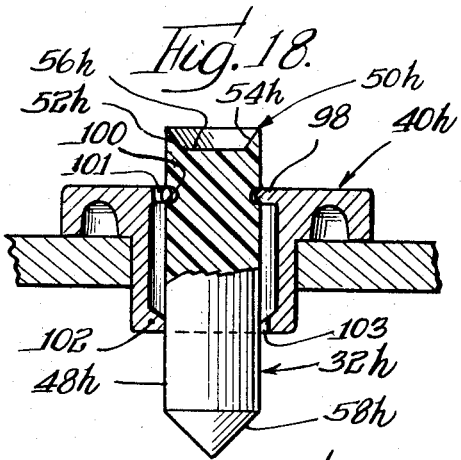
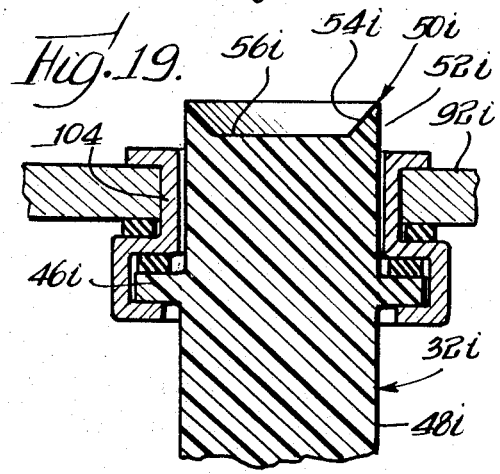
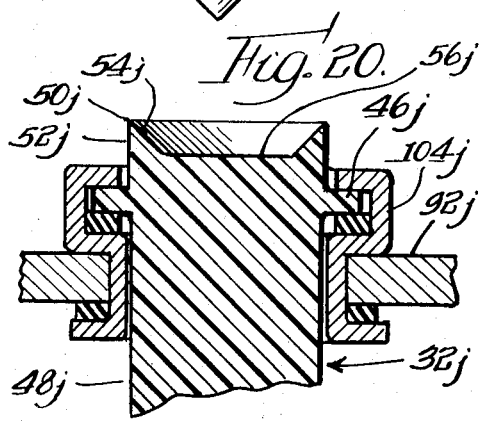

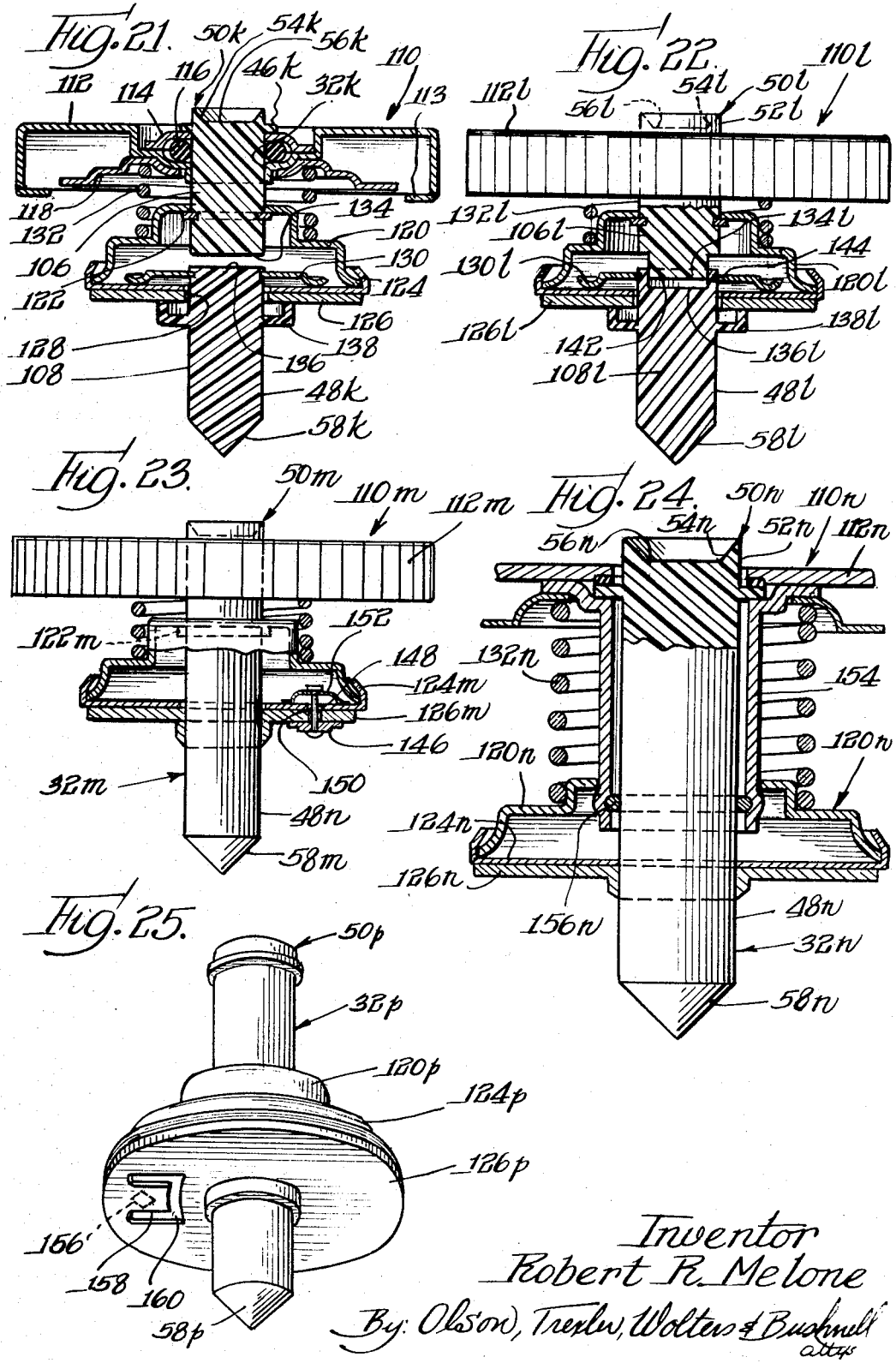

United States Patent Office 3,362,224
Patented Jan. 9, 1968

3,362,224
LIQUID LEVEL INDICATOR
Robert R. Melone, Des Plaines, Ill., assignor to Illinois Tool Works Inc., Chicago, Ill., a corporation of Delaware
Filed Dec. 28, 1964, Ser. No. 421,458
17 Claims. (Cl. 73—327)

ABSTRACT OF THE DISCLOSURE

A visual liquid level indicating device having a reflecting surface at the inner end of a transparent body member and an annular section coincident with or projecting laterally outwardly from the outer end of the body member to concentrate light rays reflected from the inner end of the body member from different positions. To facilitate visual observation thereof, coloring dyes can be dispersed through the transparent body member.

---

The present invention relates to a novel fluid level indicator, and more specifically to visually observable fluid level indicators.

It will become apparent that various uses for fluid indicators of the type contemplated herein may suggest themselves. However, in order to facilitate the present disclosure it is observed that it is freqeuntly necessary to check the level of the electrolyte in storage batteries installed in vehicles or other places and it is also frequently necessary to check the level of the liquid in the cooling system of a vehicle. As is well known, the usual practice for checking the liquid level in either storage batteries or cooling systems contemplates the removal of the filling caps from the battery or from a radiator so as to permit a look inside. Various devices have heretofore been proposed for aiding in the checking of the liquid level in batteries, radiators and the like, but such heretofore proposed devices have not come into general use as the result of being too difficult to read or too costly.

It is an important object of the present invention to provide a novel fluid level indicator which is of simple and economical construction and which is highly effective and easily readable.

A more specific object of the present invention is to provide a novel fluid level indicator which may be readily assembled with storage batteries, radiators and the like for permitting the level of fluid therein to be determined without removal of the battery or radiator caps.

Still another important object of the present invention is to provide a novel level indicator comprising a member of light transmitting material adapted to be assembled with a battery, radiator or the like and shaped so as to collect and concentrate rays of light and reflect such light at predetermined areas with a relatively high intensity when the liquid within the battery or radiator recedes so as to avoid contact with the member, the intensity of the reflected light providing a readily observable indication of the liquid level.

Still another important object of the present invention is to provide a novel fluid level indicator of the above-described type which may be observed and read from many different positions and particularly from positions at the side of as well as above the indicator.

Another object of the present invention is to provide a novel fluid level indicator comprising a member of light transmitting material formed so as to present an area having an appearance of being relatively brightly colored when the liquid falls below a predetermined level.

Still another object of the present invention is to provide a novel indicator of the above-described type capable of detecting and indicating a plurality of different liquid levels.

A further object of the present invention is to provide a novel fluid level indicator of the above-described type which may be readily mounted in storage battery caps, radiator caps and the like.

Other objects and advantages of the present invention will become apparent from the following description and the accompanying drawings wherein:

FIG. 1 is a perspective view showing a storage battery utilizing fluid level indicators incorporating features of the present invention;

FIG. 2 is an enlarged fragmentary partial sectional view taken generally along line 2—2 in FIG. 1;

FIG. 3 is a perspective view showing a fluid level indicator member of the type used in the storage battery of FIGS. 1 and 2;

FIG. 4 is a sectional view of the indicator member of FIG. 3;

FIGS. 5 and 6 are end views of the indicator member of FIGS. 1 through 4 and respectively indicate the manner in which an outer end of the indicator member appears light when the inner end is exposed and dark or colorless when an inner end of the member is immersed in fluid;

FIG. 7 is a sectional view showing a fluid indicator member incorporating a modified form of the present invention;

FIG. 8 is an elevational view showing another modified form of the present invention having an inner end of prismatic shape;

FIG. 9 is an inner end view of the device shown in FIG. 8;

FIG. 10 is an elevational view showing another modified form of the present invention wherein an inner end of the device is provided with a colored element;

FIG. 11 is a sectional view taken along line 11—11 in FIG. 10;

FIG. 12 is a sectional view showing a further modified form of the present invention capable of indicating multiple liquid levels;

FIG. 13 is a sectional view taken along line 13—13 in FIG. 12;

FIG. 14 is a sectional view showing a further slightly modified form of the present invention wherein the indicator member is mounted for adjustment whereby to permit an indication of different liquid levels;

FIG. 15 is a sectional view similar to FIG. 14 but showing how the device may be adjusted to indicate a different liquid level;

FIG. 16 is a sectional view showing another modified form wherein an inner end of the indicator device is provided with multiple surfaces;

FIG. 17 shows a modified form wherein an inner end of the indicator member is dyed or otherwise colored;

FIG. 18 is a sectional view showing a modified form of the invention wherein an indicator member may be snapped into assembled relationship with a cap member;

FIG. 19 is a fragmentary sectional view showing a modified structure for mounting an indicating member in an opening in a wall;

FIG. 20 is a fragmentary sectional view showing a variation of the structure of FIG. 19;

FIG. 21 is a sectional view showing a radiator cap incorporating a fluid level indicator constructed in accordance with features of the present invention, which cap includes pressure relief and vacuum breaker valve means;

FIG. 22 shows a modified form of the structure shown in FIG. 21;

FIG. 23 shows another modified form of a radiator cap structure constructed in accordance with features of the present invention wherein the fluid indicator member is formed in one piece;

FIG. 24 shows still another radiator cap structure incorporating a one-piece fluid indicator member in accordance with the present invention; and FIG. 25 is a perspective view showing a portion of another radiator cap assembly incorporating features of the present invention.

Referring now more specifically to the drawings wherein like parts are designated by the same numerals throughout the various figures, a storage battery 30 is shown in FIGS. 1 and 2, which battery utilizes a fluid level indicator 32 constructed in accordance with features of the present invention in association with each of its cells 34, 36 and 38. As is apparent from FIGS. 1 and 2, an upper end of each fluid level indicator 32 projects above the battery and is exposed and is visible from positions above and at all sides of the battery. It will be appreciated that storage batteries are frequently installed in relatively out-of-the-way or inaccessible places in automobiles, airplanes, trucks and the like or even at stationary installations so that it may be necessary to observe the fluid level indicator 32 from various angles and particularly from the side and from substantial distances and in poor light. Each indicator member 32 is constructed as will be described in detail below so that even under such handicaps, it may be easily and accurately read.

As shown best in FIGS. 2–4, each fluid level indicator 32 comprises a member or rod formed from a light transmitting material such as an acrylic, glass, styrene or other clear or partially clear material. The member 32 is preferably elongated so that it may be mounted in a wall of the battery or the fluid vessel or in a filler cap 40 of the battery with an upper end thereof exposed and a lower end thereof projecting downwardly at least to a desired level 42 of liquid 44 within the vessel as shown in FIG. 2. In this embodiment, an annular rib 46 is provided around an upper end portion of the member 32 for engagement with the cap 40 as shown in FIG. 2 and limiting downward movement of the indicator member. An annular seal 47 is positioned between the cap member and the body member 32 for preventing leakage.

As shown best in FIGS. 3 and 4, the member 32 has an elongated cylindrical side surface 48. In accordance with a feature of the present invention the member is formed with a wall portion in form of an annular prism 50 merging with an upper end of the side surface 48. In this embodiment, the annular prism has a cylindrical outer annular surface 52 having the same diameter as and providing a continuation of a cylindrical surface 48. The annular prism 50 also has an inner annular surface 54 which has an inverted frusto-conical configuration and is inclined axially downwardly and inwardly from an outer terminal edge thereof or a junction with the surface 52. The angular relationship between the surface 54 and the longitudinal axis of the member 32 and the surface 52 may be varied, but the surface 54 preferably extends at an angle of about 45° with respect to the longitudinal axis. The inclined annular surface 54 of the prism 50 intersects a central end surface portion 56 of the member 32. Surface portion 56 is preferably substantially flat and is disposed in a plane substantially perpendicular to the longitudinal axis of the member 32. The surface portion 56 combines with the inclined surface 54 in providing the level indicator member 32 with a dish-shaped outer end for the purpose described more fully below.

An end of the member 32 opposite from the annular prism 50 and end surfaces 56 is formed with a reflecting surface 58 which, in this embodiment, is substantially conical. While the angle of inclination of the surface 58 may be caried, it preferably extends at about 45° with respect to the longitudinal axis of the member 32.

As will be understood, the material of the member 32 has an index of refraction such that a substantial portion of those light rays from the sun or any artificial source which strike the outer end surfaces 52, 54 and 56 from above and from the side of the device are refracted and directed downwardly along the length of the member 32. In other words, light rays passing into the device travel until they meet an exterior surface of the device. If the exterior surface, such for example, as the side surface 48 is exposed to the air, the ray is reflected back into the device. This action holds true as long as there is a substantial angle of incidence between the direction of the light ray and the surface which it strikes and more particularly as long as the angle of incidence is in excess of a known critical angle. In any event, the function is such that a major portion of the light rays entering the upper end of the device 32 is directed along the length of the device to the reflecting surface 58. If the reflecting surface 58 is exposed to the air the light rays are reflected back toward the outer end of the body member 32 along paths of travel such that they strike the end surfaces 52, 54 and 56 and pass out from the upper end of the member 32 and may be observed. If, on the other hand, the reflecting surface 58 is immersed in the liquid 44 as shown in FIG. 2, most of the light rays pass through the surface 58 and into the liquid. In other words, the light rays are not reflected back toward the outer end of the device so that the outer end appears dark. Thus, it is seen that when the outer end of the indicator device 32 appears dark, the inner end is immersed in the liquid 44 and the liquid is at a desired level 42 and when the liquid falls to a lower level 60 so that the inner end of the device is exposed to the air, the outer end of the device appears lighted.

The manner in which light rays travel through and within the indicator member 32 is shown more in detail in FIG. 4. More specifically, the line 62 indicates a light ray which enters through the upper end surface 56 in a direction extending generally axially of the member. In other words, the angle of incidence between the light ray 62 and the surface 56 is such that the light ray passes through the surface 56 and generally axially of the body 32 until it strikes the reflecting surface 58 where it is reflected in the manner described above and in accordance with the angular arrangement of the reflecting surface 58. In the embodiment shown, the light ray 62 is reflected back toward the end surface 56 in a direction so that it again passes therethrough and is readily observable from directly above the member 32.

The line 64 indicates another light ray which is directed downwardly toward the device 32 and intersects the surface 56 at an angle of incidence such that it is slightly refracted and travels downwardly until it is reflected by the surface 58 and then directed upwardly until it intersects the inclined surface 54 of the prism 50. As shown, the ray 64 intersects the surface 54 at an angle such that it is refracted outwardly toward the surface 52. Since the angle of incidence between the ray 64 and the surface 52 is small the ray passes laterally outwardly through the surface 52 and is readily visible from the side. Additional rays are indicated by the lines 66 and 68 which initially intersect the prism surfaces 52 and 54 from the side and from above and are refracted so as to travel downwardly through the body member 32 and intersect the reflecting surface 58 in a manner which causes the rays to be refracted and directed back up through the member 32 and out of the device through the prism or upper end surfaces. It has been found that by providing the upper end of the member 32 with the dish-shaped configuration and more specifically with the annular peripherally arranged prism having a downwardly and inclined surface 54, light rays impinging against the upper end of the device from substantially all angles and the sides are collected and concentrated within the device and refracted in a manner providing a relatively high concentration of light rays emitting from the prism surfaces and the end surface 56 whereby the prism and the end surface are highly luminous. In other words, the prism 50 is well lighted and easily visible when the liquid level is below the reflecting surface 58 and the contrast between the appearance of the prism 50 when it is lighted and when it is dark upon immersion of the surface 58 in the liquid is readily determined. It is further to be noted that the annular arrangement of the prism enables an observer to determine whether or not the prism is lighted from substantially all positions around the circumference of the prism as well as from positions above the prism.

The material from which the member 32 is formed may be clear or substantially clear in which case the upper end of the device will appear relatively bright but substantially colorless when the liquid level is low and the light is reflected back. It has been found that the observable indication provided by the device or, in other words, the readability of the device may also be enhanced by forming the body member from material having small amounts of coloring pigments or dyes uniformly dispersed throughout the material. In other words, if the member 32 is to be formed from glass or a resin which is intially substantially clear, small amounts of coloring dyes are mixed with the glass or resinous material in the molten or liquid state prior to the forming of the material into the member 32. As suggested, the amount of coloring material added to and mixed throughout the material of the member 32 is relatively small and is indicated by the small specks or dots 70 in FIG. 4. Preferably, only sufficient coloring material is added to provide an observer looking at the side surface 48 of the device with a relatively faint impression of the color. Thus the material of the member 32 is still relatively clear and capable of efficiently transmitting light rays. It has been found, however, that even with such small amounts of coloring material uniformly dispersed throughout the member 32, the light rays which are concentrated at and emitted from the end surfaces 52 and 54 and also the generally flat end surface 56 appeared to be relatively highly or brightly colored. In other words, in the embodiment shown in FIGS. 1 through 4, when the member 32 is viewed from the side, the upper portion defined by the annular surface 52 appears to have a much stronger or intense color than the remainder of the device defined by the side surface 48. In addition when the device is viewed from the top, the end portions defined by the surfaces 54 and 56 also appear to have a color which is much more intense and brilliant than would be expected when viewing the surface 48 from a side position.

It is believed that the apparent discrepancy between the colors of the device when looking at the side surface 48 and when looking at the end surfaces 52, 54 and 56 results from the fact that the light rays emitted from the end surfaces travel much greater distances through the material of the member 32. For example, the light ray 62 travels a distance which is about twice the length of the member 32 while the light ray 68 which zig-zags back and forth within the body member travels a still greater distance. As all the rays of the spectrum progress from the points at which they enter the member 32, they are progressively and increasingly modified by the coloring material dispersed throughout the member 32, i.e., due to a subtractive effect, all colors except that color desired are absorbed and the rays finally leaving the upper end surfaces of the device are composed of essentially one color of rather intense hues. In other words, the longer the path of travel of the light rays within the member 32, the more the subtractive effect and the more those rays will appear to be colored when they are observed leaving the member 32.

Of course, when the lower end of the member 32 is imersed into the liquid the upper end defined by prism surfaces 52 and 54 and surface 56 will appear to be dark and substantially colorless. FIG. 5 is shaded to indicate the relatively intense color of the end of the member 32 when the lower end 58 is exposed to the air while FIG. 6 is intended to show how the device appears to be substantially dark and colorless when the lower end is immersed in the water. In addition, attention is directed to FIG. 3 wherein the shading 72 at the upper end suggests the manner in which the side 52 of the prism as well as the surfaces 54 and 56 appear to be colored more brightly or intensely than the portions of the device defined by the side 48. Of course, various different colors such as yellow, red, blue, green and the like may be used.

FIG. 7 shows a slightly modified form of the present invention which is similar to the structure described above indicated by the application of identical reference numerals with the suffix *a* added. This embodiment differs in that the outer surface 52*a* of the annular prism or wall portion 50 has a frustoconical configuration and flares outwardly to a predetermined outside surface diameter from an inner minimum surface diameter of the portion 56*a* which is less than the predetermined diameter and less than the diameter of the body member. This arrangement directs the light rays emerging from surface 52*a* upwardly in a substantially parallel relationship at a predetermined angle with a plane perpendicular transversely to the indicator axis.

FIGS. 8 and 9 show a further modified form of the present invention wherein elements corresponding to those described above are identified by the same reference numerals with the suffix *b* added. In this embodiment the side surface 52*b* is arcuately flared thereby providing a broader lateral dispersion of light rays as set forth above. Furthermore, the reflecting inner end surface 58 is formed to provide a prism 74. The arrangement is such that the light rays are reflected by the prism section 74 in much the same manner as the conical section described above.

FIGS. 10 and 11 show another modified form of the present invention wherein elements corresponding to those described above are indicated by the identical reference numerals with the suffix *c* added. In this embodiment the reflecting surface 58 is replaced by a separate flat reflecting element 58*c* secured to the lower end of the body member 32*c*. Furthermore, it is contemplated that the element 58*c* may be colored while the body member 32*c* may be substantially clear. The light reflected from the element 58*c* and emitted from the upper end of the device will appear to be colored.

FIGS. 12 and 13 show a device 32*d* which is similar to the structure described above. In this embodiment the device 32*d* comprises separate elements 78 and 80 which are telescopically associated with each other and combined to provide an upper prism 50*d* and an upper end 56*d*. However, the arrangement is such that the lower ends of the elements 78 and 80 have separate radially spaced prism surfaces 58 and 84 respectively which are axially spaced from each other. This enables the device 32*d* to provide an indication of separate liquid levels in much the same manner as the device 32*b* described above.

FIGS. 14 and 15 show another embodiment wherein similar elements to those described above are identified by the same reference numerals with the suffix *e* added. This embodiment shows a manner of adjustably mounting a device 32*e* so that it may be axially shifted between the positions shown in FIGS. 14 and 15 for indicating different liquid levels. For example, the device may be withdrawn to a raised position shown in FIG. 14 during a filling process and then pushed downwardly to the position shown in FIG. 15 for indicating a minimum level of liquid. In this embodiment it is contemplated that the member 32*e* shall include axially spaced abutments 86 and 88 which may be in the form of annular rings. An aperture 90 is provided through a wall 92 in the member in which the device 32*e* is mounted. This member may be the wall of a battery, radiator or the like or may be an end of a closure or cap. A seal ring 94 is mounted in the wall 92 and slidably but sealingly engages the side of the device 32*e* between the abutments 86 and 88. It will be appreciated that the same mounting means may be used in connection with many of the other devices 32 described herein and particularly those described above and also shown in FIG. 16.

FIG. 16 shows an indicator device 32f which differs from those described above in that the lower end is provided with multiple prism surfaces 74f and 76f. In this embodiment the surface 76f extends transversely within the surface 74f and a finer or more exact indication of the liquid level is provided.

FIG. 17 shows a modified form of the present invention wherein the reflecting surface 58g is exteriorly provided with a coating 96 of transparent paint, dye or the like. Thus the light rays reflected from the colored surface 58g will appear to be colored. However, this modification requires the additional manufacturing step of coloring the surface 58g. This embodiment further shows the provision of an annular shoulder presenting a cutting edge 89 for facilitating insertion of the member 32g into an initially slightly undersized aperture in the mounting cap. In addition an annular barb 91 is formed on the member 32g for engaging the cap and securing the member 32g and the cap in assembled relationship.

FIG. 18 shows a further embodiment of the present invention which is similar to the structure described above as indicated by the application of indentical reference numerals with the suffix h added to corresponding elements. In this embodiment, the member 32h is mounted by providing a cap member 40h with an internal annular flange 98 which is adapted to be snapped into an annular groove 100 formed in the member 32h. The cap member 40h is preferably formed from a resilient or plastic material so as to facilitate flexing of the flange 98. Furthermore, the member 40h is provided with a second flange 102 spaced axially inwardly from the flange 98 for slidably receiving and engaging the side of the member 32h and preventing the side from twisting or tilting with respect to the member 40h. Small vent apertures 101 and 103 are formed in the flanges 98 and 102.

FIGS. 19 and 20, respectively, show indicator members 32i and 32j which may be formed in accordance with the features described above and which are adapted for slightly different mountings in a wall. In FIG. 19 an adapter 104 mounted in an aperture in the wall has an annular section cooperably interengageable with a flange 46i spaced substantially from the outer end of the member 32i and adapted to be located within or beneath the wall. On the other hand, the structure shown in FIG. 20 comprises an adapter 104j which is adapted to cooperate with a flange 46j on the member 32j and located adjacent the outer end thereof and outwardly of the wall.

In FIG. 21 there is shown a level indicator 32k which is similar to the devices described above as indicated by the application of identical reference numerals with the suffix k added to corresponding elements. In this embodiment the indicator 32k is formed in two separate pieces 106 and 108 and comprises a part of a radiator cap assembly 110.

The cap assembly 110 includes a sheet material cap member 112 having a central aperture through which the upper part 106 of the indicator device extends. An annular washer 114 overlies and is welded or otherwise secured to a central portion of the cap member 112 and engages the flange 46k on the indicator member for limiting upward movement of the cap relative to the indicator. A sealing ring 116 is provided between the washer 114 and the cap member for sealingly engaging the indicator.

An annular flexible sheet material member 118 is assembled beneath the cap member 112 and provides a secondary seal in a known manner when venting of the radiator takes place. The cap member 112 incorporates radially inward projections 113 of a known type for cooperation in a known manner with locking lugs or the like which are provided at the outlet of or the filling opening of a radiator or other liquid container. As is known, it is generally desirable to maintain the cooling systems of which a radiator is a part under pressure while at the same time it is desirable to permit the release of excess pressure. Thus, the radiator cap assembly 110 further includes a pressure relief valve subassembly comprising an inverted cup-shaped member 120 slidably disposed on the indicator part 106 and retained thereon by a snap ring 122 or other suitable device. A washer or annular plate 124 is secured to a lower margin of the inverted cup-shaped member 120 and carries a sealing gasket 126. However, it is to be noted that an annular space or clearance 128 is provided between inner margins of the elements 124 and 126 and the lower part 108 of the indicator 32k. Furthermore, the indicator part 108 has an end portion which extends upwardly through the elements 124 and 126 and is secured to a spring washer 130 which overlies the element 124. A compression spring 132 extends between the dish-shaped member 120 and the part 118. As will be appreciated, the sealing gasket 126 is urged against a lip of the radiator opening when the cap assembly is applied to the radiator and held there by the spring 132. In the event the pressure within the cooling system increases beyond a predetermined level, the spring 132 is compressed and the gasket 126 is raised for relieving the pressure.

When the cap is applied to the radiator outlet as described above, the spring 132 is partially compressed so that the indicator part 108 is moved upwardly in abutting relationship with the part 106. These parts are provided with mating surfaces 134 and 136 respectively. When these surfaces are in abutting relationship, the parts 106 and 108 function together to transmit light throughout their combined length in much the same manner as if they were formed in one piece, whereby the two-piece indicator 32k serves to indicate the level of the liquid within the radiator in substantially the same manner as the one-piece indicator members described above. If desired the surfaces 134 and 136 may be coated with mineral oil or the like to facilitate light transmission even if the surfaces do not abut each other perfectly.

As previously indicated, a clearance 128 is provided between the indicator part 108 and the elements 124 and 126. This clearance is normally sealed by providing the indicator part 108 with a flange 138 projecting beneath the gasket 126 and engageable with the gasket 126. This structure enables the indicator part 108 to function as a vacuum relief valve as well as part of the indicator. More specifically, when the pressure within the cooling system falls below the atmospheric pressure, the resilient washer 130 which extends above and in at least partially spaced relationship to the element 124, flexes in response to the outside pressure so that indicator part 108 and the flange 138 thereof shift downwardly in order to break the seal between the flange and the element 140 and the gasket.

FIG. 22 shows a cap assembly 110l similar to the structure shown in FIG. 21 as indicated by the application of identical reference numerals with the suffix l added to corresponding elements. In this embodiment the indicator parts 106l and 108l are respectively provided with an axially extending reduced diameter portion 142 and an axially extending flange 144 which are slidably telescopically associated with each other and serve to maintain the parts in accurate axial alignment.

FIG. 23 shows another radiator cap assembly 110m wherein the indicator member 32m is formed in one piece. In this embodiment the vacuum breaker valve is provided by a separate small valve element 146 carried by a stem 148 projecting through a vent aperture 150 in the washer 124m and gasket 126m. An upper end of the stem 148 is connected to and resiliently urged upwardly by a spring washer 152 so that the valve element 146 is normally engaged against the gasket 146m for sealing the aperture 150.

FIG. 24 shows another cap assembly 110n wherein the indicator device 32n is formed in one piece. In this embodiment the structure is such that a separate tubular member 154 is provided for supporting the spring loaded inverted dish-shaped member 120n of the pressure relief valve subassembly.

FIG. 25 shows a subassembly of another radiator or closure cap assembly wherein parts corresponding to those described above are indicated by the identical reference numerals with the suffix p added. In this embodiment the vacuum relief valve is provided by forming a small aperture 156 through the disc 124p which backs up the resilient or rubber gasket 126p. In addition, the gasket is formed with an integral flap 158 which is aligned with the aperture 156 and which is defined by a generally U-shaped slot 160 cut in the gasket. It will be apparent that the internal pressure normally retains the flap 158 in sealing engagement around the periphery of the aperture 156 and that the flap is free to open the aperture 156 and relieve any vacuum or reduced pressure within the system.

While preferred embodiments of the present invention have been shown and described herein, it is obvious that many structural details may be changed without departing from the spirit and scope of the appended claims.

The invention is claimed as follows:

1. A liquid level indicator comprising a member of light-transmitting material having an inner portion immersible in liquid and an outer portion, an annular prism section integral with said outer portion for collecting and concentrating light rays, and means providing surface means at said inner portion for reflecting light rays toward said annular prism section when said inner portion is exposed and for transmitting light rays into the liquid when said inner portion is immersed in the liquid, said annular prism including an annular outer side surface and an annular inner side surface, at least one of said surfaces being inclined axially and inwardly from an outer terminal edge thereof toward a central axis for promoting the refraction of light rays reflected from said reflecting surface means so as to permit observation of said light rays from the end of and from the side of said annular prism section.

2. A liquid level indicator, as defined in claim 1, which includes small amounts of coloring material dispersed within and throughout said light-transmitting material of said member, said coloring material being sufficient to provide only a relatively light appearance of color when viewing portions of said member other than said annular prism section, said coloring material modifying light rays passing between said reflecting surface means and said prism section and emitted from said prism section for providing said prism section with an appearance of being relatively highly colored.

3. A liquid level indicator, as defined in claim 1, wherein said prism outer annular surface is substantially cylindrical and has a substantially uniform diameter throughout its length.

4. A liquid level indicator, as defined in claim 1, wherein said outer annular surface of said prism section flares outwardly for promoting a broader lateral dispersion of light rays emitted therefrom.

5. A liquid level indicator, as defined in claim 1, wherein said reflecting surface means comprises separate and radially spaced reflecting surfaces.

6. A liquid level indicator, as defined in claim 5, wherein said separate reflecting surfaces are axially separated from each other for indicating different liquid levels.

7. A liquid level indicator, as defined in claim 1, wherein said light-transmitting material is substantially clear and said means providing said reflecting surface means is colored for modifying light rays reflected by the surface means to provide an appearance of being colored.

8. A liquid level indicator, as defined in claim 1, wherein said member, said prism section and said reflecting surface means are formed in one piece.

9. A liquid level indicator, as defined in claim 1, wherein said inner portion and said outer portion of said member comprise separate inner and outer pieces, said indicator including means providing a removable closure for a liquid container, said closure including means connected with and supporting said pieces in alignment with each other and for abutting each other when the closure means is applied to the container and for separation from each other when the closure means is removed from the container.

10. A liquid level indicator, as defined in claim 9, wherein said closure means comprises an outer cap member connected with said outer piece, a valve member connected with said inner piece for sealing an opening in the liquid container, spring means between said cap member and said valve member for yieldably biasing said valve member away from said cap member and for permitting raising of the valve member in response to pressure within the liquid container, means providing a vent opening through said valve member, and additional valve means closing said last mentioned opening and responsive to decreases in pressure within said liquid container for relieving any vacuum therein.

11. A liquid level indicator, as defined in claim 1, which includes means shiftably mounting said member for positioning the inner portion of said member selectively at a plurality of depths within a liquid container for enabling the member to be adjusted for sensing and indicating a plurality of liquid levels.

12. A liquid level indicator, as defined in claim 1, wherein said member includes abutment shoulder means around one of said portions and interengageable with a complementary mounting means for securing said member against axial displacement.

13. A liquid level indicator, as defined in claim 1, wherein said annular prism section surrounds a central end surface portion of said outer portion, said end surface portion being substantially planar.

14. A liquid level indicator comprising an elongated rod-like body member of at least partially clear light-transmitting material and having an inner end portion immersible in liquid and an outer end portion, providing a light ray receiving and emitting surface means, the said outer end portion including a wall portion projecting laterally outwardly from the adjacent portion of the body member to a predetermined outside surface diameter from an inner minimum surface diameter less than said predetermined diameter and less than the diameter of said body member, means providing reflecting surface means at the inner end portion of said body member for reflecting light rays toward said first mentioned surface means when said inner end portion is exposed to air and for transmitting light rays into liquid when said inner end portion is immersed in the liquid, and a small quantity of coloring material mixed in and dispersed throughout said light-transmitting material, said body member having a longitudinally extending circumferential side surface between said first mentioned surface means and said second surface means, said coloring material being sufficient to provide only a relatively faint appearance of color when viewing said side surface of said body member, said coloring material modifying light rays passing between said first mentioned surface means and said second surface means and emitted from said first mentioned surface means for providing said first mentioned surface means with an appearance of being relatively highly colored.

15. A liquid level indicator, as defined in claim 14, wherein said first mentioned surface means comprises an annular prism section integral with said outer end portion, said prism section including an annular outer side surface merging with a said side surface, and said annular prism section including an inner annular side surface inclined axially and inwardly from a terminal end thereof and providing the outer end of said member with a generally dished configuration.

16. A liquid level indicator, as defined in claim 15, wherein said reflecting surface means has a substantially conical configuration.

17. A liquid level indicator, as defined in claim 15, wherein said inner annular surface of said prism section has an inverted frusto-conical configuration and wherein said outer end portion of said body member includes a central substantially planar end surface surrounded by and merging with said frusto-conical surface.

References Cited

UNITED STATES PATENTS

| | | | |
|---|---|---|---|
| 787,170 | 4/1905 | Glew | 88—1 |
| 904,163 | 11/1908 | Vissering | 73—323 |
| 1,883,971 | 10/1932 | Kryzanowsky | 73—327 |
| 2,123,479 | 7/1938 | Spencer | 73—327 |
| 2,554,557 | 5/1951 | Brown et al. | 73—327 |
| 2,637,209 | 5/1953 | Kendall et al. | 73—327 |
| 2,906,169 | 9/1959 | Saffer | 88—1 |
| 3,000,345 | 9/1961 | Gray et al. | 73—323 |

LOUIS R. PRINCE, *Primary Examiner.*

D. M. YASICH, *Assistant Examiner.*